J. I. MOREHEAD.
CHANGE MAT.
APPLICATION FILED MAR. 19, 1910.

986,936.

Patented Mar. 14, 1911.

Witnesses

Inventor
John I. Morehead.

By
Attorneys.

UNITED STATES PATENT OFFICE.

JOHN I. MOREHEAD, OF KENSINGTON, KANSAS.

CHANGE-MAT.

986,936.  Specification of Letters Patent.  Patented Mar. 14, 1911.

Application filed March 19, 1910. Serial No. 550,345.

*To all whom it may concern:*

Be it known that I, JOHN I. MOREHEAD, citizen of the United States, residing at Kensington, in the county of Smith and State of Kansas, have invented certain new and useful Improvements in Change-Mats, of which the following is a specification.

This invention has for its object a simple and efficient device for use on counters or the like, whereby to facilitate the operation of picking up change, and the invention consists in certain constructions and arrangements of the parts that I shall hereinafter fully describe and claim.

Figure 1:
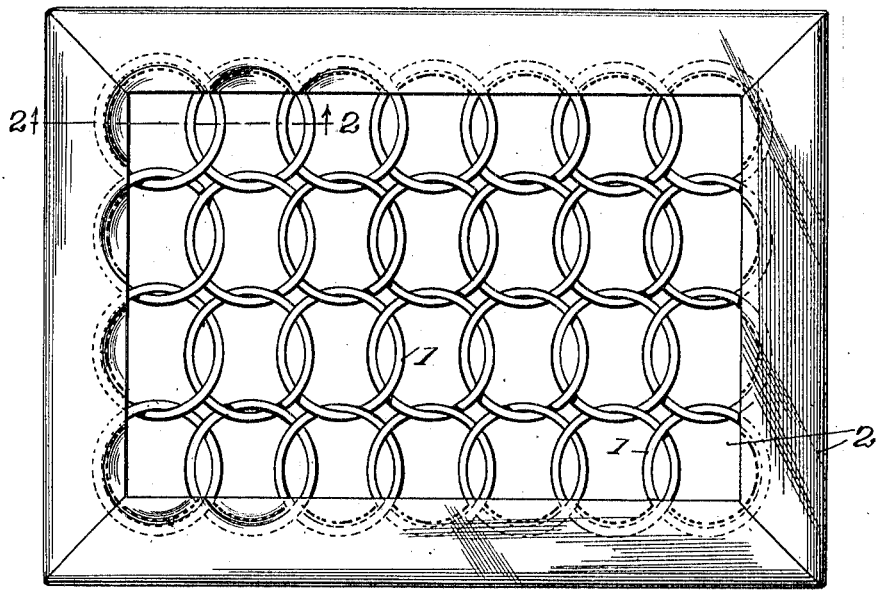
Figure 2:
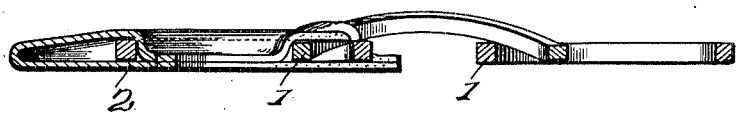
Figure 3:
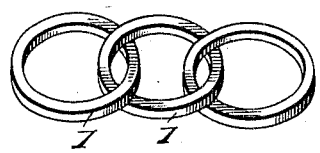

For a full understanding of the invention, reference is to be had to the following description and accompanying drawings, in which:

Figure 1 is a plan view of a change mat constructed in accordance with my invention; Fig. 2 is an enlarged fragmentary sectional view thereof on the line 2—2 of Fig. 1; and, Fig. 3 is a perspective view of some of the rings.

Corresponding and like parts are referred to in the following description and indicated in all the views of the drawings by the same reference characters.

My improved change mat may be of any desired size and shape, although preferably rectangular as shown, and comprises any desired number of interlaced rings 1 and a base 2. The rings are preferably flat and are not rigidly connected together, but are so arranged that they may be turned and thereby more easily cleaned. Furthermore, the interlacing of the rings, as before specified, renders the device capable of being folded or rolled when not in use, as the base 2 is formed of felt or any other cloth which will tend to avoid scratching the counter, show-case, or the like upon which the device is placed. The base 2 has its marginal edges turned up and folded inwardly over a portion of the marginal rings of the series, the base being then hemmed so as to secure the rings in place. Manifestly, the rings should be of a diameter small enough to prevent the passage of small coins therethrough.

From the foregoing description in connection with the accompanying drawing, the operation of my improved change mat will be apparent. In the practical use of the device, change thrown upon the ring 1 may be easily picked up, owing to the fact that there are numerous openings formed by the rings into which the purchaser may thrust his fingers so as to easily grasp the coin at its edge.

It is evident that the device may be very cheaply made and that it will be an attractive accessory.

Having thus described the invention, what is claimed as new is:

1. As a new article of manufacture, the herein described change mat embodying a plurality of interlaced rings and a cloth base underneath said rings, the marginal edges of the base being turned inwardly over a portion of the marginal rings and hemmed, whereby to secure the rings to the base.

2. As a new article of manufacture, the herein described change mat, embodying a plurality of loosely interlaced and flexibly connected rings, and a flexible base extending entirely underneath the plurality of rings and secured at its margin thereto.

3. As a new article of manufacture, the herein described change mat embodying a plurality of loosely interlaced and flexibly connected rings, and a flexible margin of textile fabric connected to the rings.

In testimony whereof I affix my signature in presence of two witnesses.

JOHN I. MOREHEAD. [L. S.]

Witnesses:
W. T. JOHN,
N. M. JOHN.

---

Copies of this patent may be obtained for five cents each, by addressing the "Commissioner of Patents, Washington, D. C."